United States Patent [19]

On et al.

[11] Patent Number: 5,649,077
[45] Date of Patent: Jul. 15, 1997

[54] MODULARIZED ARCHITECTURE FOR RENDERING SCALED DISCRETE COSINE TRANSFORM COEFFICIENTS AND INVERSE THEREOF FOR RAPID IMPLEMENTATION

[75] Inventors: Bill Ngoc On; Mandayam A. Narasimhan, both of Singapore, Singapore

[73] Assignee: Institute of Microelectronics, National University of Singapore, Chai Chee Industrial Park, Singapore

[21] Appl. No.: 632,713

[22] Filed: Apr. 15, 1996

Related U.S. Application Data

[63] Continuation of Ser. No. 220,116, Mar. 30, 1994, abandoned.

[51] Int. Cl.$^6$ .................................................. G06T 1/20
[52] U.S. Cl. ................................. 395/119; 364/725.02
[58] Field of Search ....................... 395/119; 364/715.07, 364/725

[56] References Cited

PUBLICATIONS

H.S. Hou, "A Fast Recursive Algorithm For Computing the Discrete Cosine Transform," IEEE Transactions on Acoustics, Speech, and Signal Processing, vol. ASSP-35, No. 10, pp. 1455-1461. Oct. 1987.

H.S. Hou, "Resursive Scaled-DCT," SPIE vol. 1567 Applications of Digital Image Processing XIV, pp. 402-412 1991.

Linzer, et al, "New Scaled DCT Algorithms for Fused Multiply/Add Architectures", ICASSP '91: Acoustics, Speech & Signal Processing Conference, pp. 2201-2204 1991.

Wang, et al, "Highly Parallel VLSI Architectures for the 2-D DCT and IDCT Computations", TENCON '94, IEEE Region 10 Conference, pp. 295-298 1994.

*Primary Examiner*—Heather R. Herndon
*Assistant Examiner*—Rudolph J Buchel
*Attorney, Agent, or Firm*—Lawrence Y. D. Ho

[57] ABSTRACT

The present invention describes a circuit for performing high speed forward Scaled Discrete Cosine Transform (SDCT) and inverse Scaled Discrete Cosine Transform (ISDCT) in pipeline architecture which is ideally, but not exclusively, used for compressing and decompressing large volume image data in real time. A high throughput of image data transform and inverse transform is achieved with a relatively slow internal clock. The four stage pipeline architecture of the present invention requires no more than five multipliers in rendering either the forward SDCT or inverse SDCT coefficients. The lower-order SDCT's for either the forward or the inverse direction are imbedded in the higher-order forward SDCT or inverse SDCT respectively. By taking advantage of the recursive properties of the SDCT's, a larger size SDCT can be always implemented by using a combination of variants of smaller size SDCT. The scaling effects of the coefficients is restored as the compressed image data undergoes the inverse quantization stage.

2 Claims, 9 Drawing Sheets

1

MODULARIZED ARCHITECTURE FOR RENDERING SCALED DISCRETE COSINE TRANSFORM COEFFICIENTS AND INVERSE THEREOF FOR RAPID IMPLEMENTATION

This is a continuation of application Ser. No. 08/220,116 filed on Mar. 30, 1994, now abandoned.

BACKGROUND OF THE INVENTION

1. Field of the Invention

This invention relates to a high speed processor for converting spatial domain signals, such as video signals, into transformed domain representations with a Scaled Discrete Cosine Transform (SDCT) for use in performing image data compression. Likewise, this invention also discloses a high speed processor for use in performing image data decompression with Inverse Scaled Discrete Cosine Transform (ISDCT).

2. Description of the Related Art

Discrete Cosine Transform (DCT) is one of the most effective techniques for performing video data compression or video bandwidth compression. For example, the current international standards for image compression, the so-called Joint Photographic Experts Group (JPEG) and Motion Picture Coding Experts (MPEG), are based on the DCT method. It should be understood by one skilled in the art that video and image data are used interchangeably. In performing a DCT, the image is partitioned into many square blocks so that each block may be transformed individually. Currently, the JPEG and MPEG standards recommend that the block size be 8 pixels by 8 pixels. Each block may be transformed by one-dimensional DCT in the fashion of row by row followed by column by column. Subsequently, the DCT coefficients are quantized to filter high frequency components followed by an encoding process prior to transmission.

Nevertheless, the computational complexity in performing a DCT is the main concern in designing VLSI DCT chips because DCT imposes a stiff speed limitation for compressing high-definition video image in real time. For example, see U.S. Pat. Nos. 4,797,847 and 4,831,574. P. Duhamel and H'Mida showed in their paper, "New $2^n$ DCT Algorithms Suitable for VLSI Implementation," in Proceedings of IEEE International Conferences on Acoustics, Speech and Signal Processing (ICAASP-87), April 1987, Dallas, U.S.A., that the theoretical lower bound for implementing a one-dimensional 8-point DCT requires 11 multiplications. Recently, C. Loeffler, A. Lightenberg, and G. S. Moschytz presented a class of implementations for one-dimensional 8-point DCT using 11 multiplications in their paper, "Practical Fast One-dimensional DCT Algorithms with 11 Multiplications," in Proceedings of IEEE International Conferences on Acoustics, Speech and Signal Processing (ICAASP-88), 1989.

More recently, Y. Arai, T. Agui and M. Nakajima proposed that many of the DCT multiplications can be formulated as scaling multipliers to the DCT coefficients in their article, "A Fast DCT-SQ Scheme for Images," in Transactions of IEICE, Vol. E-71, No. 11, ppg. 1095-1097, November 1988. The DCT after the multipliers are factored out is called the Scaled DCT (SDCT). Evidently, the SDCT remains orthogonal as DCT but no longer normalized, while the scaling factors may be restored in the following quantization process. They have demonstrated that a one-dimensional 8-point SDCT needs only five multipliers, which is less than half of the theoretical lower bound for the corresponding DCT. E. Feig has mathematically described the SDCT, in particular the 8×8 SDCT, in the article, "Fast Scaled-DCT Algorithm," presented at the 1990 SPIE/SPSE Symposium of Electronic Imaging Science and Technology, 12 February 1990, Santa Clara, Calif., U.S.A., and a formal paper, "Fast Algorithms for the Discrete Cosine Transform," published in IEEE Transactions on Signal Processing, Vol. 40, No. 9, ppg. 2174-2193, September 1992.

However, the recursive properties of the SDCT have not been mentioned in all the previous publications. The recursive properties of DCT was first described by H. S. Hou in the article, "A Fast Recursive Algorithm for Computing the Discrete Cosine Transform," published in IEEE Transactions on Acoustics, Speech and Signal Processing, Vol. ASSP-35, No. 10, ppg. 1455-1461, October 1987. Subsequently, H. S. Hou presented the recursive properties of SDCT in the article, "Recursive Scaled-DCT," at the 1991 SPIE International Symposium, San Diego, Calif., U.S.A., appeared in conference proceedings 1567, ppg. 402-412, 22 Jul. 1991.

The recursive properties of SDCT allow one to implement a larger size SDCT using a combination of variants of smaller size SDCT. Consequently, in accordance with the invented architecture and the recursive SDCT algorithm presented in this application, a high throughput of image data compression and decompression is achieved with a relatively slow internal clock while minimizing the number of multipliers used in performing a larger size SDCT.

SUMMARY OF THE INVENTION

The present invention describes a circuit for performing high speed forward Scaled Discrete Cosine Transform (SDCT) and inverse Scaled Discrete Cosine Transform (ISDCT) in pipeline architecture which is ideally, but not exclusively, used for compressing and decompressing large volume image data in real time. A high throughput of image data transform and inverse transform is achieved with a relatively slow internal clock. The four stage pipeline architecture of the present invention requires no more than five multipliers in rendering either the forward SDCT or inverse SDCT coefficients. The lower-order SDCT's for either the forward or the inverse direction are imbedded in the higher-order forward SDCT or inverse SDCT respectively. By taking advantage of the recursive properties of the SDCT's, a larger size SDCT can be always implemented by using a combination of variants of smaller size SDCT. The scaling effects of the coefficients is restored as the compressed image data undergoes the inverse quantization stage.

DETAILED DESCRIPTION OF THE INVENTION

An apparatus for rendering automatically scaled discrete cosine transform (SDCT) coefficients is described. In the following description, numerous specific details are set forth such as registers, multipliers, adders and subtractors, etc. in order to provide a thorough understanding of the present invention. It will be obvious to one skilled in the art that the present invention may be practised without these specific details. In other instances, well-known parts such as those involved with the A/D and D/A converter and well-known steps such as run-length coding, Huffman coding, motion estimation and error correction are not shown in order to avoid obscuring the present invention.

Figure 1A:
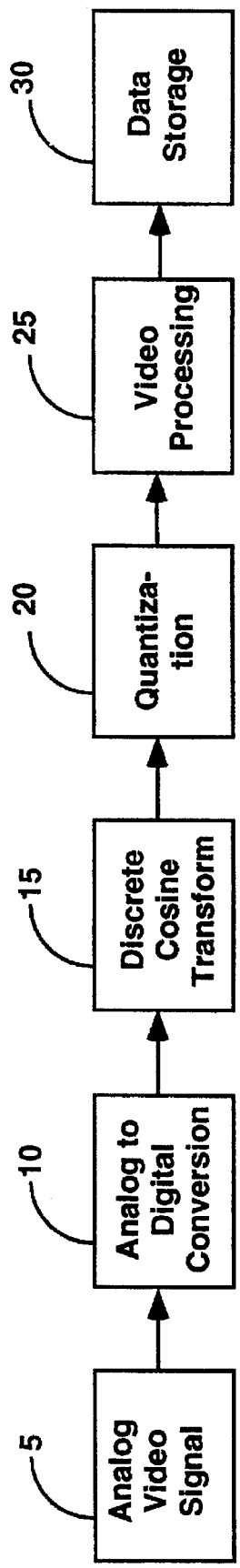
FIG. 1A illustrates the steps a DCT encoder transforms, compresses and stores or transmits video signals.
Figure 1B:
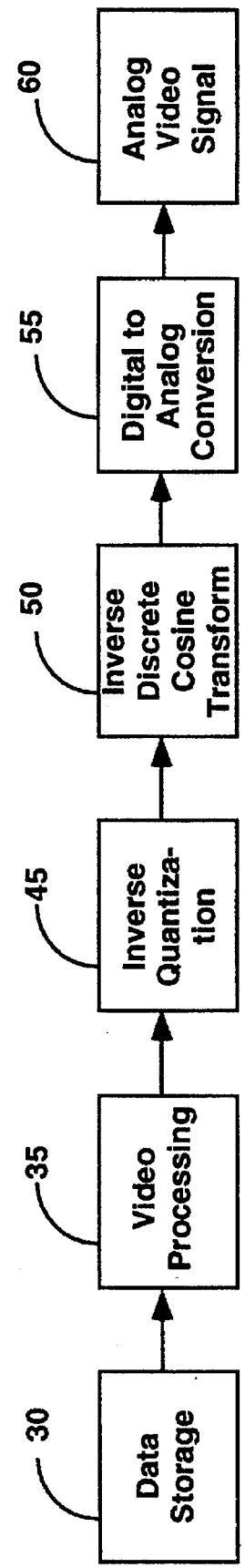
FIG. 1B shows the steps a DCT decoder decompresses, inverse transforms and replays digitized image signals.

FIG. 1A illustrates the generic steps a DCT encoder transforms, compresses, stores or transmits video signals Similarly, FIG. 1B shows the generic steps a DCT decoder decompresses, inverse transforms and replays video signals. By generic steps, the present invention refers to the common specification of 8×8 discrete cosine transform (DCT) among the international standards for still image coding (JPEG), video coding (MPEG) and visual telephony (CCITT H.261). The encoding steps comprise three stages: computation of the transform coefficients, quantization of the transform coefficients, and conversion of the transform coefficients into run length pairs after reorganization of the data in a zigzag scanning order. The decoding process reverses the steps that of the encoding process.

In FIG. 1A, analog video signal 5 is converted to digital signal in A/D step 10. The outputs from the A/D conversion step 10 are preferrably, but not exclusively, digital data in the range of [0,255]. This is to comply with the 8 bit data word size specified in JPEG, MPEG and CCITT H.261, and to provide enough accuracy even for the decoding steps. The 8×8 data block is provided as input to the discrete cosine transform (DCT) stage 15 for rendering a plurality set of 64 DCT coefficients. These outputs from the DCT stage 15 can be regarded as the relative amount of the 2 dimensional spatial frequency contained in the 8×8 point input signal. For a typical 8×8 sample block from a source image, most of the high frequencies in the transform domain have zero or near zero amplitude. The DCT stage 15 concentrates most of the signal into the lower frequencies in the transform domain, and lays the foundation for the quantization stage 20 which follows it to achieve data compression. After output from the DCT stage 15, each of the 64 DCT coefficients is quantized in conjunction with a Quantization Table in quantization stage 20. This table (not shown) must be specified by the application as an input to the encoder (stages 15, 20 and 25). For examples of such tables, see *Encoding parameters of digital television for studios*, CCIR Recommendations, Recommendation 601, 1982. The purpose of the quantization stage 20 is to achieve further compression by representing DCT coefficients with no greater precision than is necessary to achieve the desired image quality. In other words, the quantization stage 20 discards information which is visually insignificant. Quantization is defined as division of each DCT coefficient by its corresponding quantizer step size, followed by rounding to the nearest integer.

Referring again to FIG. 1A, the quantized output from the quantization stage 20 is provided as input to a video processing stage 25. The video processing stage 25 comprises various coding processes such as run-length coding, Huffman coding, motion estimation and error correction. It should be understood by one skilled in the art that the present invention does not concern the video processing stage 25. As such, the details of stage 25 are ommitted for clarity purpose. The compressed output from the video processing stage 25 is either stored in data storage 30 or transmitted remotely.

In FIG. 1B, the process of video signal compression is reversed from steps 30 to 60. In other words, compressed video signals from data storage 30 is decompressed in video processing stage 35, dequantized in inverse quantization stage 45, and inverse transformed in inverse DCT stage 50. The decompressed video output from the inverse DCT stage 50 is provided as input to the D/A conversion step in 55 and replayed in step 60.

For the remainder of the detailed description of the present invention, the presentation shall concentrate on elaborating on the DCT stage 15 and Inverse DCT stage 50 of FIGS. 1A and 1B respectively. As mentioned briefly above, the computational complexity in performing a DCT is the main concern in designing VLSI DCT chips because DCT imposes a stiff speed limitation for compressing high-definition video image in real time. Recently, Y. Arai , T. Agui and M. Nakajima proposed that many of the DCT multiplications can be formulated as scaling multipliers to the DCT coefficients in their article, "A Fast DCT-SQ Scheme for Images," in Transactions of IEICE, Vol. E-71, No. 11, ppg. 1095–1097, November 1988. The DCT after the multipliers are factored out is called the Scaled DCT (SDCT). Evidently, the SDCT remains orthogonal as DCT but no longer normalized, while the scaling factors may be restored in the following quantization process. They have demonstrated that a one-dimensional 8-point SDCT needs only five multipliers, which is less than half of the theoretical lower bound for the corresponding DCT. E. Feig has mathematically dscribed the SDCT, in particular the 8×8 SDCT, in the article, "A Fast Scaled-DCT algorithm," presented at the 1990 SPIE/SPSE Symposium of Electronic Imaging Science and Technology, 12 Feb. 1990, Santa Clara, Calif., U.S.A., and in the formal paper, "Fast Alogrithms for the Discrete Cosine Transform," published in IEEE Transactions on Signal Processing, Vol. 40, No. 9, ppg. 2174–2193, September 1992.

However, the recursive properties of the SDCT have not been mentioned in all the previous publications. The recursive properties of DCT was first described by H.S. Hou in the article, "A Fast Recursive Algorithm for Computing the Discrete Cosine Transform," published in IEEE Transactions on Acoustics, Speech and Signal Processing, Vol. ASSP-35, No. 10, ppg. 1455–1461, October 1987. Subsequently, H. S. Hou presented the recursive properties of SDCT in the article, "Recursive Scaled-DCT," at the 1991 SPIE International Symposium, San Diego, Calif., U.S.A., appeared in conference proceedings 1567, ppg. 402–412, 22 Jul. 1991.

The recursive properties of SDCT allow one to implement a larger size SDCT using a combination of variants of smaller size SDCT. The present invention describes a pipeline architecture encompassing the recursive SDCT algorithm presented H. S. Hou's articles. A high throughput of image data compression and decompression is achieved with a relatively slow internal clock while minimizing the number of multipliers used in performing a larger size SDCT. Thus the present invention describes an architecture for scaled DCT which is optimal for VSLI integrated circuit implementation. Furthermore, the modular structure of the pipeline architecture of the present invention enhances the recursive properties of SDCT, making it suitable for high volume production of chips based on this technology.

Figure 2:
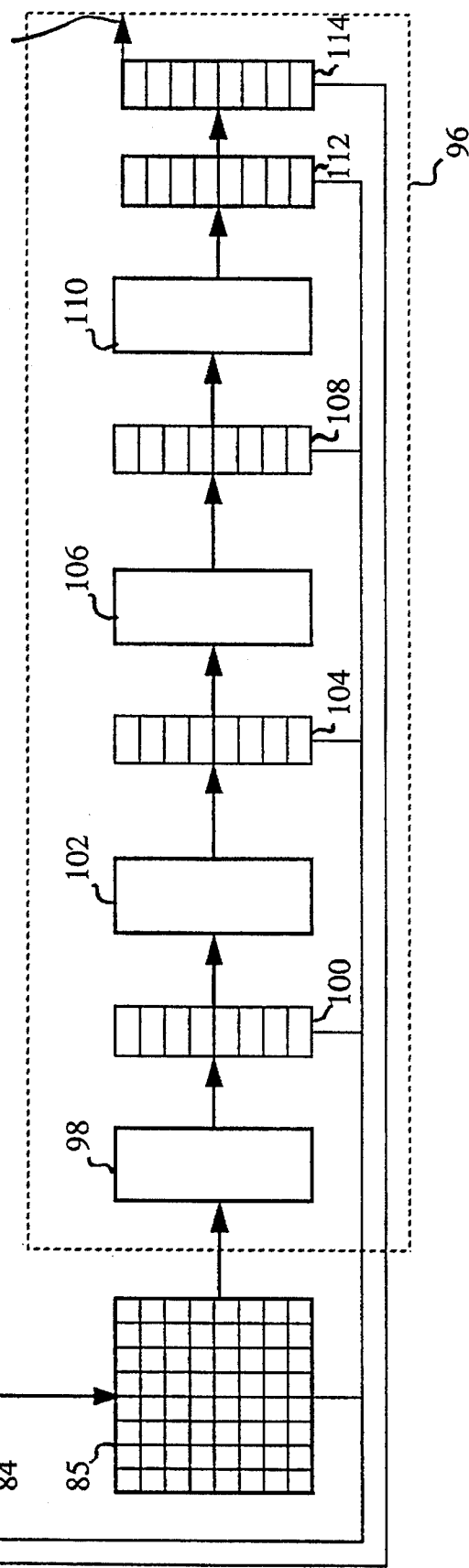
FIG. 2 is a circuit for rendering scaled discrete cosine transform coefficients for a two dimensional 8×8 block of video data in accordance with the preferred embodiment of the present invention.

FIG. 2 is a circuit for rendering scaled discrete cosine transform coefficients for a two dimensional 8×8 block of video data in accordance with the preferred embodiment of the present invention. The DCT stage 15 comprises a first dimension processing unit 62, a second dimension processing unit 96 and a memory unit 85 coupled therebetween. The first dimension processing unit 62 is coupled at its input to the A/D conversion stage 10. The output from the first dimension processing unit 62 is coupled to the input of the memory unit 85 while the output of the momory unit 85 is in turn coupled to the input of the second dimension processing unit 96. The output of the second dimension processing unit 96 is coupled to the quantization stage 20.

In FIG. 2, the first dimension processing unit 62 further comprises an input buffer 64, combinatorial circuit 68, 72, 76, 80 and a plurality of register banks 66, 70, 74 and 78. The buffer 64 is a stack of eight registers for receiving digitized data serially from the A/D converter 10. When the buffer 64 is full, the entire eight data pixel are loaded parallelly into the register bank 66. The register bank 66 is coupled to the combinatorial circuit 68; similarly, register bank 70 is interposed between combinatorial circuit 68 and 72, 74 between 72 and 76, and 78 between 76 and 80. The combinatorial circuits 68, 72, 76 and 80 operate simultaneously on the eight data elements from the register banks 66, 70, 74 and 78 sequentially and respectively. The input buffer 64 is further coupled to a clock 82. It takes the combinatorial circuit 68 eight pixel clock cycles to produce eight outputs; likewise for the other combinatorial circuits 72, 76 and 80. The register banks 66, 70, 74 and 78 are each coupled to a 1/n clock 84 where n=8 in the case of 8×8 DCT data block. The 1/n clock 84 is further coupled to the memory unit 85 for loading the output from the combinatorial circuit 80 thereto after every eight pixel clock cycle. It takes 64 clock cycles to fill up the memory unit 85. This completes the row processing of the 8×8 block of data. For the column processing, data from the memory unit 85 are provided directly at the input of the second dimension processing unit 96.

Just as the first dimension processing unit 62, the second dimension processing unit 96 has a pipeline architecture. The second dimension processing unit 96 comprises combinatorial circuit 98, 102, 106, 110, a plurality of register banks 100, 104, 108 and 112, and an output buffer 114. The buffer 114 is a stack of eight registers for receiving data parallelly from the register bank 112. When the buffer 114 is full, the data pixel are loaded serially into the quantization stage 20. The output of the memory unit 85 is coupled to the combinatorial circuit 98. Register bank 100 is interposed between combinatorial circuit 98 and 102, 104 between 102 and 106, and 108 between 106 and 110. The combinatorial circuits 98, 102, 106 and 110 operates simultaneously on the eight data elements from the register banks 100, 104, and 108 sequentially and respectively. The output buffer 114 is further coupled to the clock 82 just as the input buffer 64. It takes the combinatorial circuit 98 eight pixel clock cycles to produce eight outputs; likewise for the other combinatorial circuits 102, 106 and 110. The register banks 100, 104, 108 and 112 are each coupled to the 1/n clock 84 where n=8 in the case of 8×8 DCT data block. Notice that the 1/n clock 84 is further coupled to the memory unit 85 for receiving the input therefrom after every eight pixel clock cycle. It takes 32 clock cycles to render 8 SDCT coefficients parallelly. Once the pipeline in FIG. 2 is full, 8 coefficients are available for the quantization stage every 8 clock cycle.

Referring again to FIG. 2, the combinatorial circuit 68 is identical to combinatorial, circuit 72 to circuit 102, circuit 76 to circuit 106 and circuit 80 to circuit 110. Of course, the register banks in the first dimension processing unit 62 are also identical to that of the second dimension processing unit 96. Likewise, the input buffer 64 is identical to the output buffer 114. As mentioned earlier, the modular nature of pipeline architecture of the present invention reinforces the recursive properties of the SDCT algorithm to produce a high speed DCT processor that is ideal for VLSI implementation.

Figure 3:
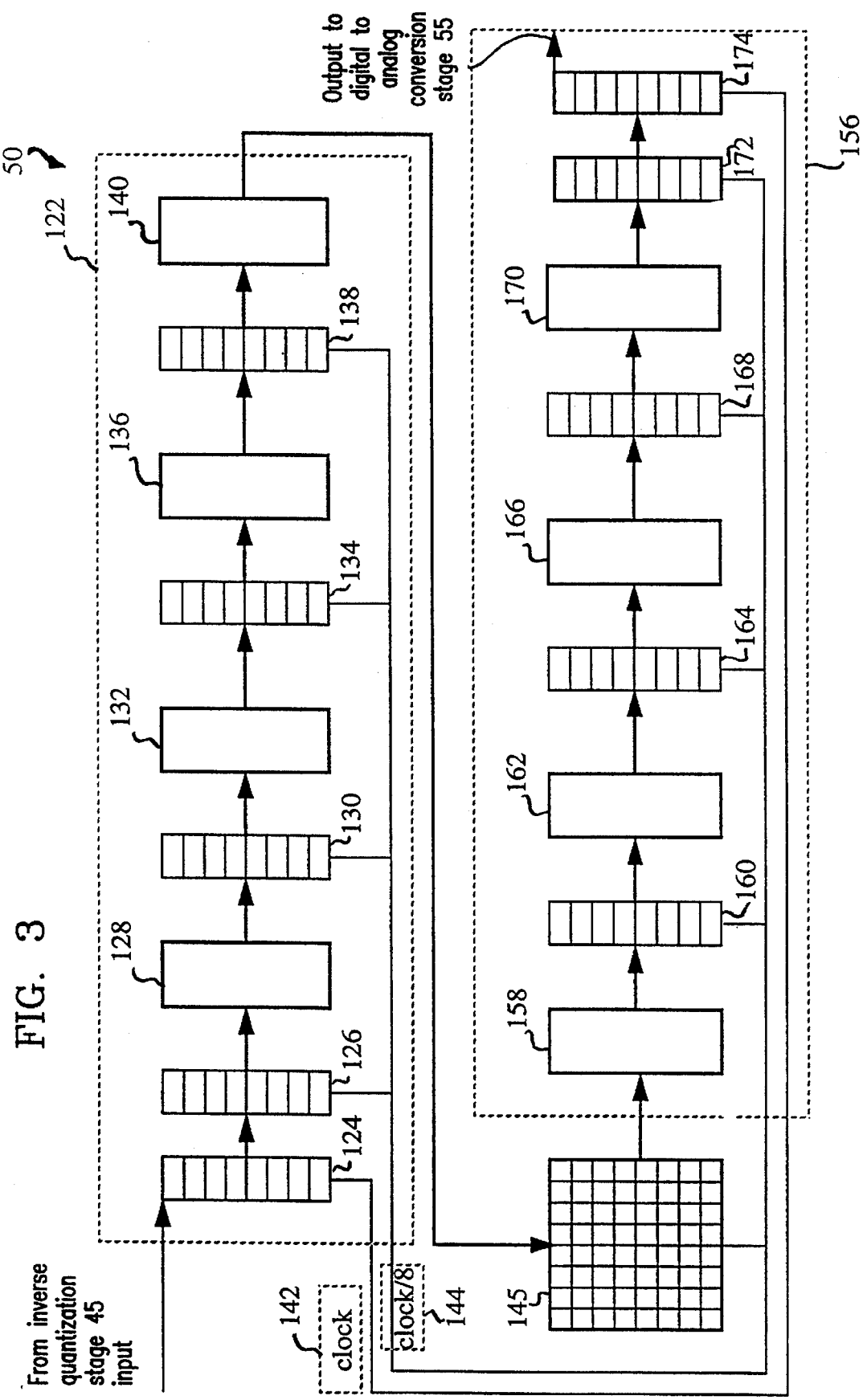
FIG. 3 is a circuit for rendering inverse scaled discrete cosine transform coefficients for a two dimensional 8×8 block of video data in accordance with the preferred embodiment of the present invention.

FIG. 3 is a circuit for rendering inverse scaled discrete cosine transform (ISDCT) coefficients for a two dimensional 8×8 block of video data in accordance with the preferred embodiment of the present invention. Before describing each component in detail, one can see structurally, the ISDCT circuit is similar to the SDCT circuit in FIG. 2. In FIG. 3, a first dimension processing unit 122 comprises an input buffer 124, combinatorial circuit 128, 132, 136, 140 and a plurality of register banks 126, 130, 134 and 138. The input buffer 124 is a stack of eight registers for receiving digitized data serially from the Inverse Quantization stage 45 in FIG. 1B. When the input buffer 124 is full, the entire eight data pixel are loaded parallelly into the register bank 126. The register bank 126 is coupled to the combinatorial circuit 128; similarly, register bank 130 is interposed between combinatorial circuits 128 and 132, 134 between 132 and 136, and 138 between 136 and 140. The combinatorial circuits 128, 132, 136 and 140 operate simultaneously on the eight data elements from the register banks 126, 130, 134 and 138 sequentially and respectively. The input buffer 124 is further coupled to a clock 142. It takes the combinatorial circuit 128 eight pixel clock cycles to produce eight outputs; likewise for the other combinatorial circuits 132, 136 and 140. The register banks 126, 130, 134 and 138 are each coupled to a 1/n clock 144 where n=8 in the case of 8×8 DCT data block. The 1/n clock 144 is further coupled to the memory unit 145 for loading the output from the combinatorial circuit 140 thereto after every eight pixel clock cycle. It takes 64 clock cycles to fill up the memory unit 145. This completes the row processing of the 8×8 block of data. For the column processing, data from the memory unit 145 are provided directly at the input of the second dimension processing unit 156.

Like the first dimension processing unit 122, the second dimension processing unit 156 has a pipeline architecture. The second dimension processing unit 156 comprises combinatorial circuit 158, 162, 166, 170, a plurality of register banks 160, 164, 168 and 172, and an output buffer 174. The buffer 174 is a stack of eight registers for receiving data parallelly from the register bank 172. When the output buffer 174 is full, the data pixel are loaded serially into the D/A conversion stage 55. The output of the memory unit 145 is coupled to the combinatorial circuit 158. Register bank 160 is interposed between combinatorial circuit 158 and 162, 164 between 162 and 166, and 168 between 166 and 170. The combinatorial circuits 158, 162, 166 and 170 operate simultaneously on the eight data elements from the register banks 160, 164, and 168 sequentially and respectively. The output buffer 174 is further coupled to the clock 142 just as the input buffer 124. It takes the combinatorial circuit 158 eight pixel clock cycles to produce eight outputs; likewise for the other combinatorial circuits 162, 166 and 170. The register banks 160, 164, 168 and 172 are each coupled to the 1/n clock 144 where n=8 in the case of 8×8 DCT data block. Notice that the 1/n clock 144 is further coupled to the memory unit 145 for receiving the input therefrom after every eight pixel clock cycle. It takes 32 clock cycles to render 8 SDCT coefficients.

Referring again to FIG. 3, the combinatorial circuit 128 is identical to combinatorial, circuit 132 to circuit 162, circuit 136 to circuit 166 and circuit 140 to circuit 170. Of course, the register banks in the first dimension processing unit 122 are also identical to that of the second dimension processing unit 156. Likewise, the input buffer 124 is identical to the output buffer 174. As mentioned earlier, the modular nature of pipeline architecture of the present invention reinforces the recursive properties of the ISDCT algorithm to produce a high speed DCT processor that is ideal for VLSI implementation.

In the article by H.S. Hou, "Recursive Scaled-DCT," at the 1991 International Symposium, San Diego, Calif., U.S.A., in conference proceedings 1567, ppg. 402–412, 22 Jul. 1991, the forward scaled DCT (SDCT) equation was shown to be:

$$F(N) = P(N) \begin{bmatrix} F\left(\frac{N}{2}\right) & 0 \\ 0 & Ft\left(\frac{N}{2}\right) \end{bmatrix} \begin{bmatrix} I\left(\frac{N}{2}\right) & 0 \\ 0 & R\left(\frac{N}{2}\right) \end{bmatrix} \begin{bmatrix} I\left(\frac{N}{2}\right) & 0 \\ 0 & V\left(\frac{N}{2}\right) \end{bmatrix} \begin{bmatrix} I\left(\frac{N}{2}\right) & Ib\left(\frac{N}{2}\right) \\ I\left(\frac{N}{2}\right) & -Ib\left(\frac{N}{2}\right) \end{bmatrix}$$

Similarly, the inverse scaled DCT (ISDCT) was derived as:

$$G(N) = \begin{bmatrix} I\left(\frac{N}{2}\right) & I\left(\frac{N}{2}\right) \\ Ib\left(\frac{N}{2}\right) & -Ib\left(\frac{N}{2}\right) \end{bmatrix} \begin{bmatrix} I\left(\frac{N}{2}\right) & 0 \\ 0 & L\left(\frac{N}{2}\right) \end{bmatrix} \begin{bmatrix} I\left(\frac{N}{2}\right) & 0 \\ 0 & Kt\left(\frac{N}{2}\right) \end{bmatrix} \begin{bmatrix} G\left(\frac{N}{2}\right) & 0 \\ 0 & Gt\left(\frac{N}{2}\right) \end{bmatrix} Pt(N)$$

Figure 4:
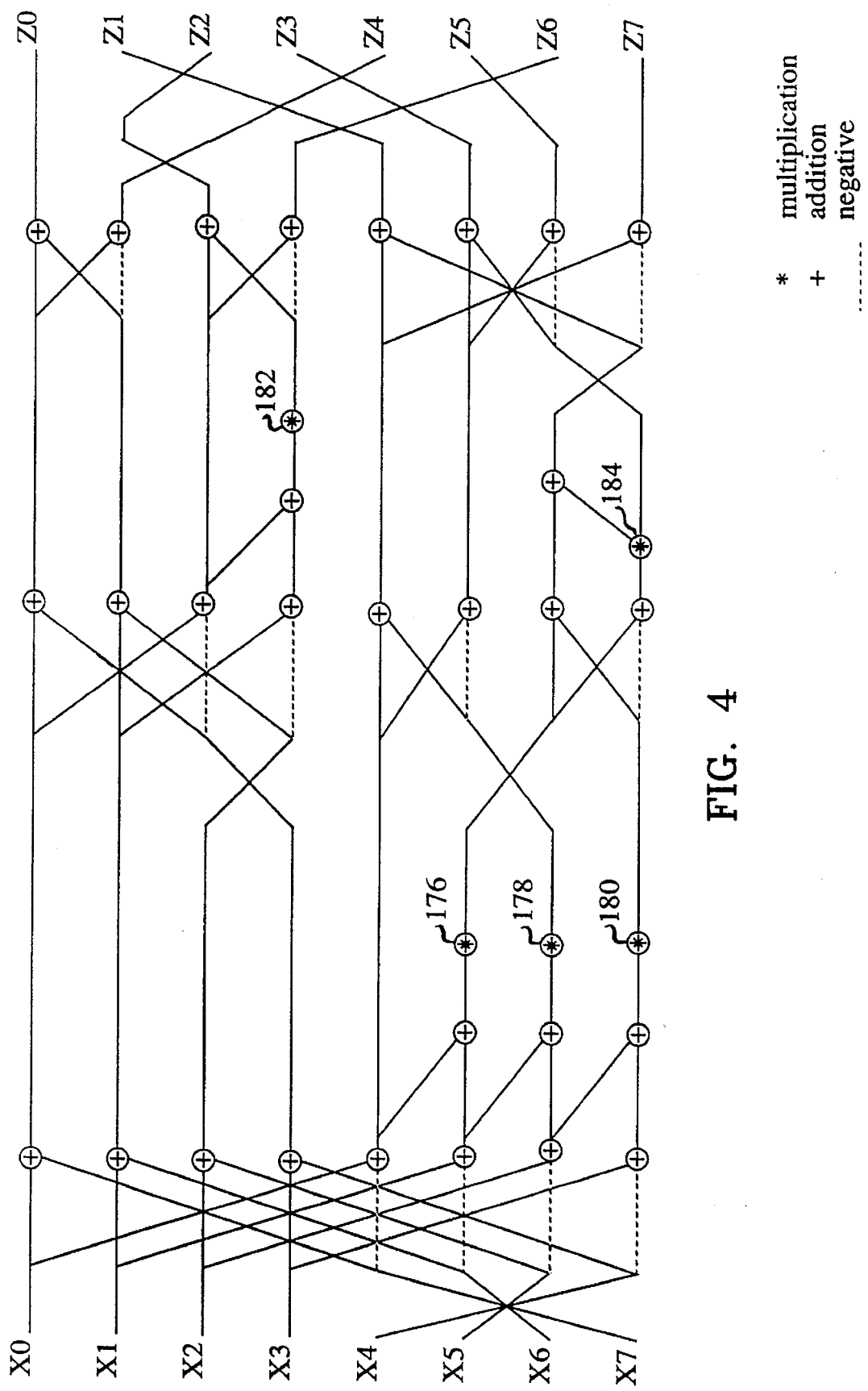
FIG. 4 shows a flowgraph of the scaled discrete cosine transform coefficients for an 8×8 block of data.

FIG. 4 shows a flowgraph of the scaled discrete cosine transform (SDCT) coefficients for a 8×1 column of data according to the SDCT circuit in FIG. 2 for the case N=8. Note that each of the datapaths Xn–Zn are relatively independent of each other. Thus it is amendable to be implemented with a parallel architecture. In addition, through careful grouping of the various arithmetic operations, the signal flowgraph in FIG. 4 can be partitioned into at most four pipelined stages for high speed data thoughput rates. In FIG. 4, the addition operations are grouped as one stage, the subtraction operations in another, and the multiplication in yet another and so forth. It can be observed that under the SDCT algorithm, that at most five multiplication operations 176, 178, 180, 182 and 184 are required for processing the 2-dimensional 8×8 SDCT coefficients. The value of the coefficients for the various multipliers are as follows:

| 176: 1/2β  | 182: ∞ |
| 178: 1/2∞  | 184: ∞ |
| 180: 1/2∂  |        | where $\beta = \cos(\pi/8)$, $\infty = \cos(\pi/4)$ and $\partial = \cos(3\pi/8)$.

Figure 5:
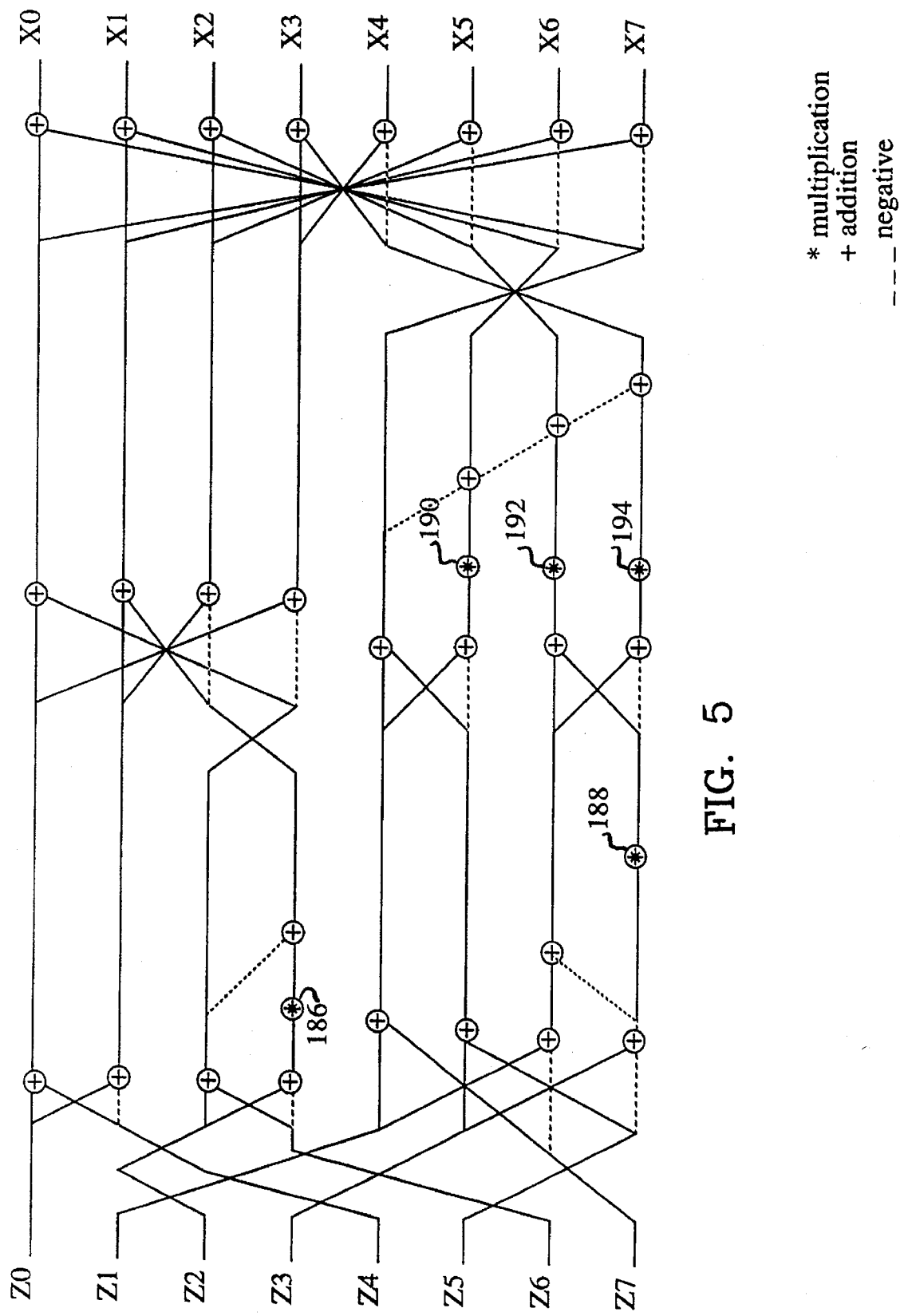
FIG. 5 shows a flowgraph of the inverse scaled discrete cosine transform coefficients for a 8×8 block of data.

Just as in FIG. 4, FIG. 5 shows a flowgraph of the inverse scaled discrete cosine transform (ISDCT) coefficients for a 8×1 column of data according to the ISDCT circuit in FIG. 3 where N=8. Note also that each of the datapaths Xn–Zn are relatively independent of each other. Thus it is also amendable to be implemented with a parallel architecture. In addition, through careful grouping of the various arthimetic operations, the signal flowgraph in FIG. 5 can be partitioned into at most four pipelined stages for high speed data thoughput rates. In FIG. 5, the addition operations are grouped as one stage, the subtraction operations in another, and the multiplication in yet another and so forth. It can be observed that under the SDCT algorithm, that at most five multiplication operations 186, 188, 190, 192, and 194 are required for processing the 2-dimensional 8×8 ISDCT coefficients. The values of the various multiplier coefficients are as follows:

| 186: 1/∞ | 190: 2β |
| 188: 1/∞ | 192: 2∞ |
|          | 194: 2∂ | where B = Cos (π/8), ∞ = Cos (π/4), and ∂ = Cos (3π/8).

where

β=Cos (π/8), ∞=Cos (π/4), and ∂=Cos (3 π/8).

Figure 6:
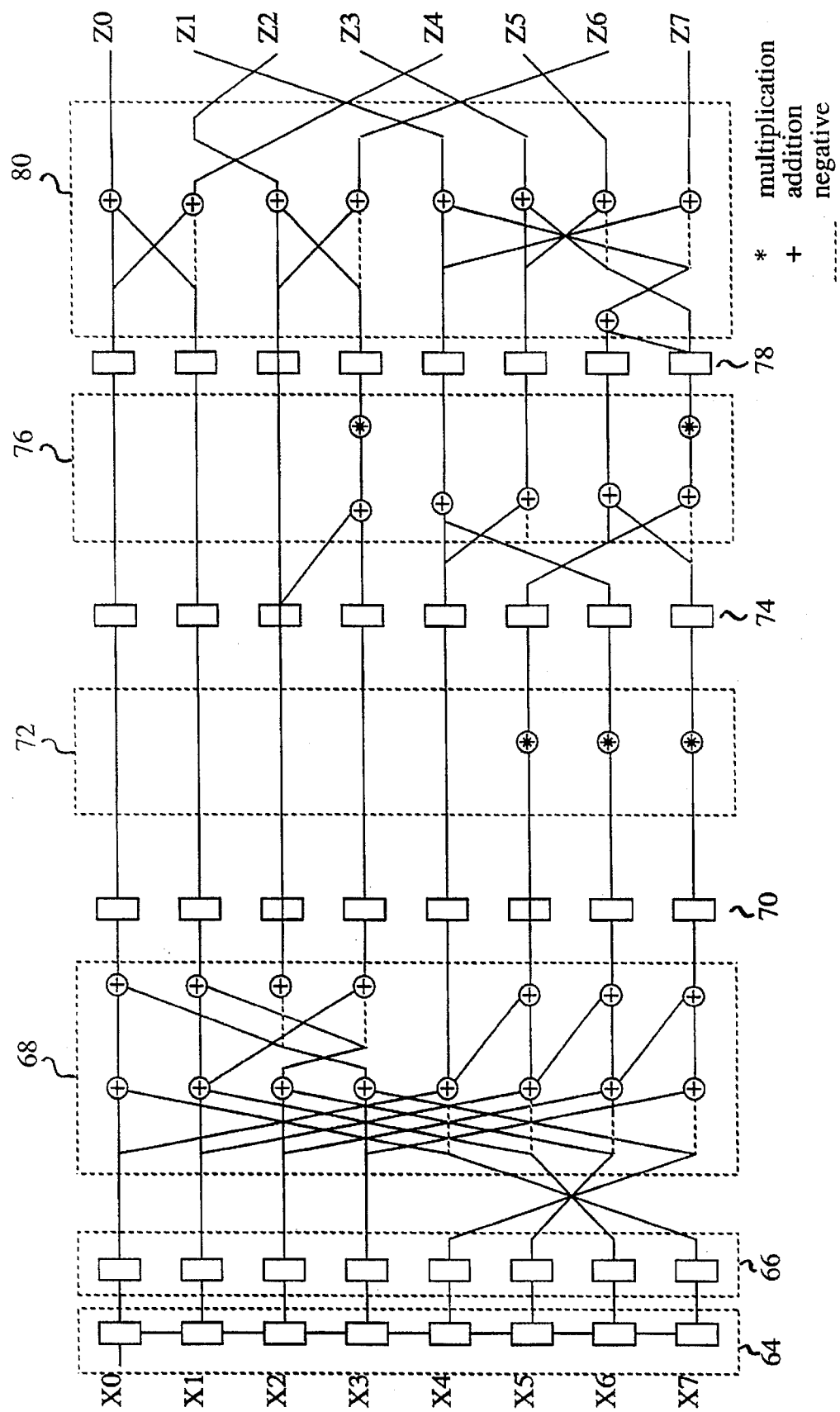
FIG. 6 describes a four stage pipelined scaled discrete cosine transform circuit in accordance with the preferred embodiment of the present invention.

FIG. 6 describes a four stage pipelined scaled discrete cosine transform circuit in accordance with the preferred embodiment of the present invention. With reference to FIGS. 2 and 4, FIG. 6 highlights the detailed circuitry for the various combinatorial circuits and register banks. Thus, register banks 64, 66, 70, 74 and 78 each comprises eight registers. The combinatorial circuit 68 comprises seven adders and six subtractors. The combinatorial circuit 72 has three multipliers; the circuit 76 comprises three adders, two subtractors and two multipliers. Finally, the combinatorial circuit 80 has five adders and four subtractors. As one can see, each of the combinatorial circuits and registers banks is self contained. Therefore, they can be implemented in VLSI with relative ease.

Figure 7:
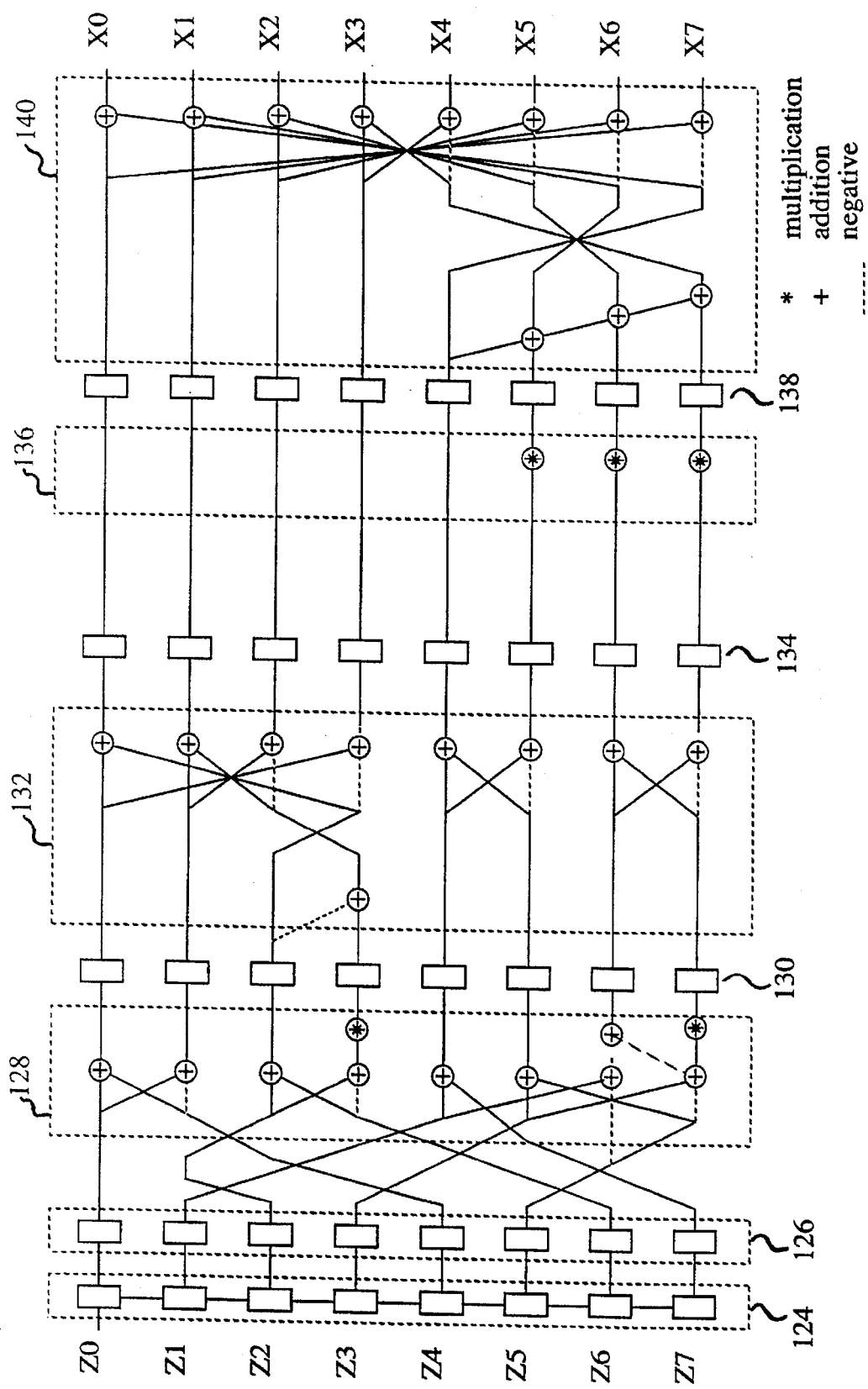
FIG. 7 describes a four stage pipelined inverse scaled discrete cosine transform circuit in accordance with the preferred embodiment of the present invention.

Similarly, FIG. 7 describes a four stage pipelined inverse scaled discrete cosine transform circuit in accordance with the preferred embodiment of the present invention. By superimposing one of the dimension processing units in FIG. 3 over the flowgraph of ISDCT processor, one derives the details for the combinatorial circuits and register banks of the ISDCT processor in FIG. 3. Register banks 124, 126, 130, 134 and 138 each comprises eight register in parallel. The combinatorial circuit 128 has four adders, two multipliers and five subtractors; the circuit 132 four adders and five subtractors; the circuit 136 three multipliers and the circuit 140 seven adders and four subtractors.

Figure 8A:
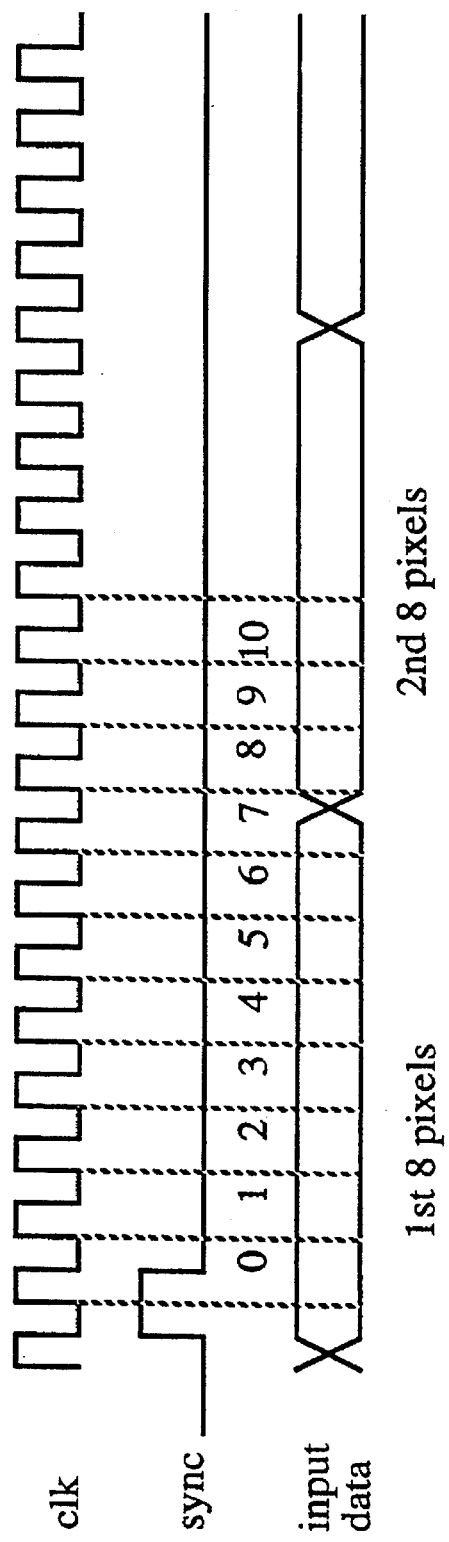
FIG. 8 is the timing diagram of the circuit in FIG. 2 illustrating the latency period of 128 clock cycle before the first scaled discrete cosine coefficient is presented on the output of the circuit.
Figure 8B:
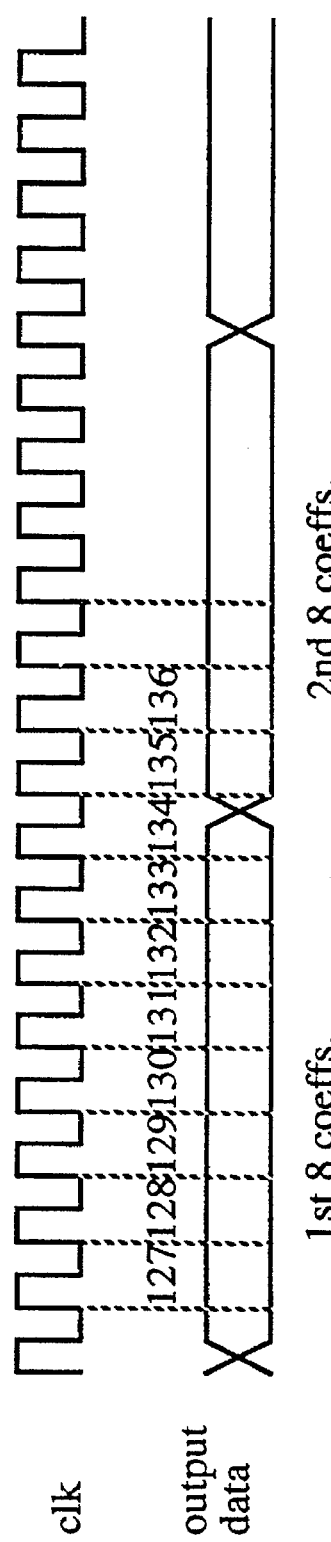

FIG. 8 is the timing diagram of the circuit in FIG. 2 illustrating the latency period of 128 clock cycle before the first scaled discrete cosine coefficient is presented on the output of the circuit. The SDCT processor accepts the pixel data input in block of 8×8 pixels. As shown in FIG. 8, the first pixel data is presented on the input bus simultaneously with the sync signal going high. The subsequent data pixels are clocked in every clock cycle.

Figure 9A:
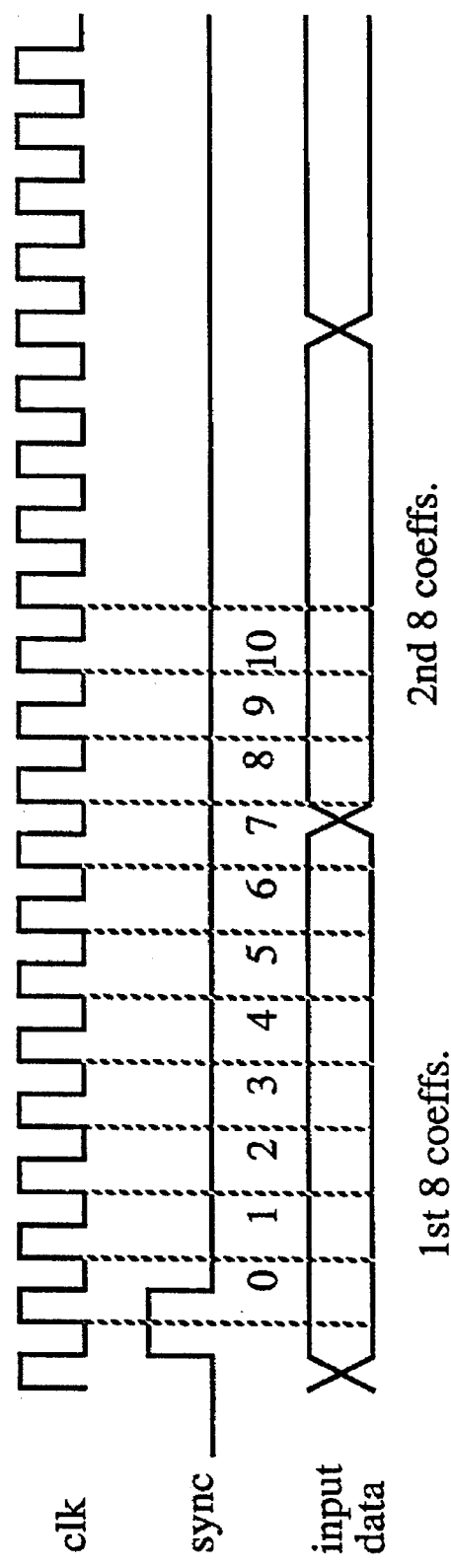
FIG. 9 is the timing diagram of the circuit in FIG. 3 illustrating the latency period of 128 clock cycle before the first inverse scaled discrete cosine coefficient is presented on the output of the circuit.
Figure 9B:
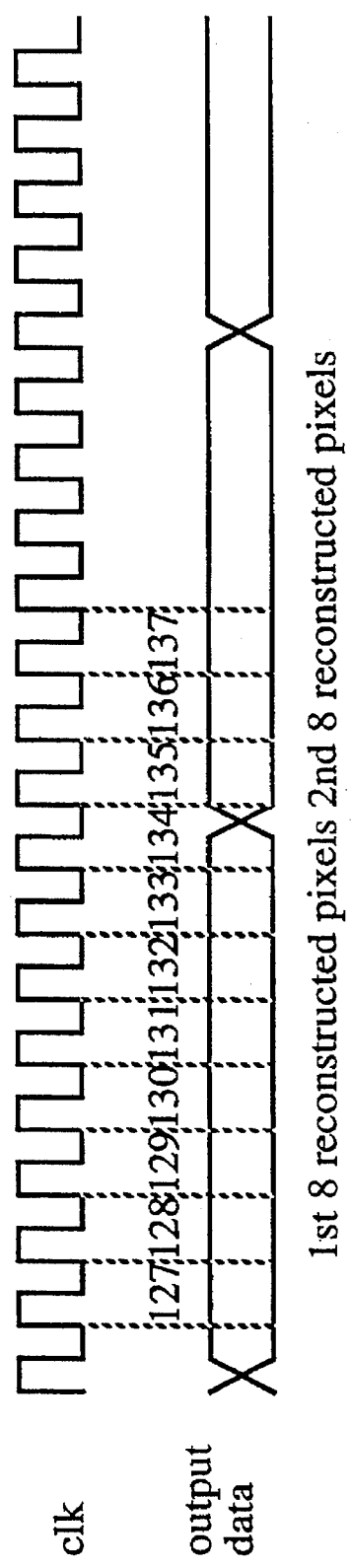

FIG. 9 is the timing diagram of the circuit in FIG. 3 illustrating the latency period of 128 clock cycle before the first inverse scaled discrete cosine coefficient is presented on the output of the circuit. The ISDCT processor accepts the coefficient data input in block of 8×8 pixels. The first coefficient data is presented on the input bus simulataneously with the sync signal going high. The subsequent data coefficients are clocked in every clock cycle.

While the present invention has been described particularly with reference to FIGS. 1 to 9 with emphasis on an apparatus to render scaled discrete cosine transform automatically, it should be understood that the figures are for illustration only and should not be taken as a limitation on the invention. It should also be understood by those skilled in the art that the SDCT and ISDCT processors described above can be combined into one circuit which switches between the SDCT and the ISDCT. The switching function of such a circuit can be fulfilled by additional multiplexors which selects different operands depending on whether SDCT or ISDCT is required. In addition, it is clear that the method and apparatus of the present invention has utility in many applications where the compression and decompression of data are required. It is contemplated that many changes and modifications may be made by one of ordinary skill in the art without departing from the spirit and the scope of the invention as described.

We claim:

1. In a system for storing image data and retrieving the same, a modularized architecture for rendering scaled discrete cosine transform coefficients of a group of N×N signal samples, said architecture adapted for rapid implementation comprising:

a first dimension processing unit for receiving digitized image data and generating a N series of first dimensional transforms along a first orthogonal direction, said first dimension processing unit further comprising a first pipelined stage, a second pipelined stage, a third pipelined stage, a fourth pipelined stage, and a plurality of registers coupled before said first stage and between first and second, second and third, and third and fourth stages, said first stage containing seven adders and six subtractors but no multipliers, said second stage containing three multipliers but no adders or subtractors, said third stage containing three adders, two subtractors and two multipliers, and said fourth stage containing five adders and four subtractors but no multipliers;

at least one memory unit for receiving said first dimensional transforms from said first dimension processing; and a second dimensional processing unit coupled at its input to the output of said memory unit for receiving said first dimensional transforms from said first dimensional processing unit for generating a second another N series of second dimensional transforms along the other orthogonal direction, said second dimensional processing unit further comprising a first pipelined stage, a second pipelined stage, a third pipelined stage, a fourth pipelined stage, and a plurality of registers coupled before said first stage, and a between first and second, second and third, and third and fourth stages, said first stage containing seven adders and six subtractors but no multipliers, said second stage containing three multipliers but no adders or subtractors, said third stage containing three adders, two subtractors and two multipliers, and said fourth stage containing five adders and four subtractors but no multipliers:

whereby said system for image storage and retrieval may compress image data in real time and yet run with a processor having 1/N clock speed.

2. In a system for storing image data and retrieving the same, a modularized architecture for rendering inverse scaled discrete cosine transform coefficients of a group of N×N signal samples, said architecture adapted for rapid implementation comprising:

a first inverse dimension processing unit for receiving digitized image data and generating a N series of first inverse dimensional transforms along a first orthogonal direction, said first inverse dimension processing unit further comprising a first pipelined stage, a second pipelined stage, a third pipelined stage, a fourth pipelined stage, and a plurality of registers coupled before said first stage and between first and second, second and third, and third and fourth stages, said first stage containing four adders and five subcontractors and two multipliers, said second stage containing four adders and five subtractors but no multipliers, said third stage containing three multipliers but not multipliers, said third and said fourth stage containing seven adders and four subtractors but not multipliers;

at least one memory unit for receiving said first inverse dimensional transforms from said first inverse dimension processing, and a second inverse dimensional processing unit coupled at input to the output of said memory unit for receiving said first inverse dimensional transforms from said first inverse dimensional processing unit for generating a second another N series of second inverse dimensional transforms along the other orthogonal direction, said second inverse dimensional processing unit further comprising a first pipelined stage, a second pipelined stage, a third pipelined stage, a fourth pipelined stage, and a plurality of registers coupled before said first stage and between first and second, second and third, and third and fourth stages, said first stage containing four adders and five subtractors and two multipliers, said second stage containing four adders and five subtractors but no multipliers, said third stage containing three multipliers but no adders or subtractors, and said fourth stage containing seven adders and four subtractors but not multipliers;

whereby said system for image storage and retrieval may decompress image data in real time and yet run with a processor having 1/N clock speed.

* * * * *

UNITED STATES PATENT AND TRADEMARK OFFICE
CERTIFICATE OF CORRECTION

PATENT NO. : 5,649,077
DATED : 07/15/97
INVENTOR(S) : Bill N. On and Mandayam A. Narasimhan It is certified that error appears in the above-identified patent and that said Letters Patent is hereby corrected as shown below:

Column 10, Lines 40-41, delete "not multiplers, said third and" and substitute therefor -- no adders or subtractors, and --.

Column 10, Line 42, delete "not" and substitute therefor -- no --.

Column 10, Line 63, delete "not" and substitute therefor -- no --.

Signed and Sealed this

Second Day of December, 1997

Attest:

BRUCE LEHMAN

*Attesting Officer*     Commissioner of Patents and Trademarks